(12) United States Patent
Toyoda et al.

(10) Patent No.: US 9,903,004 B2
(45) Date of Patent: Feb. 27, 2018

(54) HOT-ROLLED STEEL SHEET AND METHOD FOR MANUFACTURING THE SAME

(71) Applicant: NIPPON STEEL & SUMITOMO METAL CORPORATION, Tokyo (JP)

(72) Inventors: Takeshi Toyoda, Tokyo (JP); Takehiro Takahashi, Tokyo (JP); Takeshi Imai, Tokyo (JP); Takeshi Yamamoto, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 363 days.

(21) Appl. No.: 14/434,835

(22) PCT Filed: Dec. 19, 2012

(86) PCT No.: PCT/JP2012/082952
§ 371 (c)(1),
(2) Date: Apr. 10, 2015

(87) PCT Pub. No.: WO2014/097430
PCT Pub. Date: Jun. 26, 2014

(65) Prior Publication Data
US 2015/0284818 A1    Oct. 8, 2015

(51) Int. Cl.
| | | |
|---|---|---|
| *C22C 38/02* | (2006.01) | |
| *C22C 38/04* | (2006.01) | |
| *C22C 38/06* | (2006.01) | |
| *C22C 38/14* | (2006.01) | |
| *C22C 38/12* | (2006.01) | |
| *C22C 38/00* | (2006.01) | |
| *C21D 8/02* | (2006.01) | |
| *C21D 9/46* | (2006.01) | |
| *C23C 2/02* | (2006.01) | |
| *C23C 2/06* | (2006.01) | |
| *C23C 2/28* | (2006.01) | |
| *C23C 2/16* | (2006.01) | |
| *C23C 2/26* | (2006.01) | |
| *B32B 15/01* | (2006.01) | |
| *C22C 18/04* | (2006.01) | |
| *C21D 6/00* | (2006.01) | |
| *C23C 2/40* | (2006.01) | |
| *C23C 28/02* | (2006.01) | |
| *C25D 5/36* | (2006.01) | |
| *C21D 8/04* | (2006.01) | |

(52) U.S. Cl.
CPC .......... *C21D 8/0226* (2013.01); *B32B 15/011* (2013.01); *B32B 15/013* (2013.01); *C21D 6/005* (2013.01); *C21D 6/008* (2013.01); *C21D 8/0263* (2013.01); *C21D 8/0463* (2013.01); *C22C 18/04* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C23C 2/02* (2013.01); *C23C 2/06* (2013.01); *C23C 2/16* (2013.01); *C23C 2/26* (2013.01); *C23C 2/28* (2013.01); *C23C 2/40* (2013.01); *C23C 28/022* (2013.01); *C23C 28/025* (2013.01); *C25D 5/36* (2013.01); *C21D 9/46* (2013.01); *C21D 2201/05* (2013.01); *Y10T 428/12799* (2015.01)

(58) Field of Classification Search
None
See application file for complete search history.

(56) References Cited

U.S. PATENT DOCUMENTS

| 6,364,968 B1 | 4/2002 | Yasuhara et al. |
|---|---|---|
| 2006/0096678 A1 | 5/2006 | Kariya |

(Continued)

FOREIGN PATENT DOCUMENTS

| EP | 1 636 392 B1 | 9/2007 |
|---|---|---|
| JP | 2004-137565 A | 5/2004 |
| JP | 2004-339606 A | 12/2004 |

(Continued)

OTHER PUBLICATIONS

Extended European Search Report dated Apr. 21, 2016, issued in European Application No. 12890201.2.
European Office Action, dated Jan. 31, 2017, for European Application No. 12 890 201.2.
Korean Office Action dated Mar. 2, 2017, for Korean Application No. 10-2015-7014309, with a partial English translation.
International Search Report issued in PCT/JP2012/082952, dated Feb. 19, 2013.
Office Action issued in Taiwanese Application No. 101149525, dated Sep. 9, 2014.

(Continued)

*Primary Examiner* — Deborah Yee
(74) *Attorney, Agent, or Firm* — Birch, Stewart, Kolasch & Birch, LLP

(57) ABSTRACT

A hot-rolled steel sheet having a tensile strength of 900 MPa or more, the hot-rolled steel sheet consisting of, in mass %, C: greater than 0.050% and less than or equal to 0.10%, Si: greater than or equal to 0.1% and less than or equal to 2.0%, Mn: greater than or equal to 1.0% and less than or equal to 3.0%, P: less than or equal to 0.1%, S: less than or equal to 0.01%, Al: greater than or equal to 0.005% and less than or equal to 0.05%, N: less than or equal to 0.01%, Ti: greater than or equal to 0.10% and less than or equal to 0.20%, Nb: greater than or equal to 0% and less than or equal to 0.06%, B: greater than or equal to 0% and less than or equal to 0.03%, Ca: greater than or equal to 0% and less than or equal to 0.005%, and the balance: Fe and impurities. An average crystal grain size is less than or equal to 7.0 μm, and an X-ray random intensity ratio in {211} <011> orientation that is parallel to a rolled surface and a rolling direction is less than or equal to 2.5.

11 Claims, No Drawings

(56) References Cited

U.S. PATENT DOCUMENTS

2007/0089814 A1    4/2007   Sugiura et al.
2014/0044989 A1    2/2014   Toda et al.

FOREIGN PATENT DOCUMENTS

| JP | 2005-015854 A | 1/2005 |
|---|---|---|
| JP | 2005-248240 A | 9/2005 |
| JP | 2005-272988 A | 10/2005 |
| JP | 2006-124789 A | 5/2006 |
| JP | 2006-161139 A | 6/2006 |
| JP | 2009-024226 A | 2/2009 |
| JP | 2010-090476 A | 4/2010 |
| JP | 2011-012347 A | 1/2011 |
| JP | 2011-140672 A | 7/2011 |
| JP | 2011-256404 A | 12/2011 |
| JP | 2012-136773 A | 7/2012 |
| TW | 201247897 A1 | 12/2012 |

OTHER PUBLICATIONS

Korean Office Action, dated Jun. 17, 2016, for corresponding Korean Application No. 10-2015-7014309, with a partial English translation.
Communication dated Sep. 14, 2017, issued in corresponding European Patent Application No. 12 890 201.2.

HOT-ROLLED STEEL SHEET AND METHOD FOR MANUFACTURING THE SAME

TECHNICAL FIELD

The present invention relates to a hot-rolled steel sheet and a method for manufacturing the hot-rolled steel sheet. More specifically, the present invention relates to a hot-rolled steel sheet having excellent low-temperature toughness, excellent hole expandability, and a tensile strength of 900 MPa or more, and a method for manufacturing the hot-rolled steel sheet.

BACKGROUND ART

In recent years, in order to reduce the weight of the body of a car to increase fuel efficiency of automobiles, for example, high-strength steel sheets have been used for suspension members. In addition, since the regulation on collision safety has become stronger, there are needs to use high-strength steel sheets also for members having complex shapes, which have been made of low-strength steel sheets only. However, in general, as the strength of the steel sheet becomes higher, the ductility thereof is decreased and the formability degrades. Accordingly, in order to use the high-strength steel sheet for a member having a complex shape, it is necessary to manufacture a steel sheet that has both high formability and high strength. In particular, since a hot-rolled high-strength steel sheet is subjected to stretch-flanging to be used for suspension members of automobiles, stamped hole expandability is important as the index of strength and stretch-flanging. The stamped hole expandability of a steel sheet can be evaluated by an evaluation method regulated in ISO 16630.

Patent Document 1 discloses a method of performing cooling, immediately after final rolling at a temperature of lower than "$Ar_3$ point+100° C.", at an average cooling speed of greater than or equal to 400° C./second until the temperature becomes "$Ar_3$ point−100° C." so as to refine ferrite grains and obtain a strong <111> texture. This method improves the ductility and stretch-flanging property, resulting in improvement in the anisotropy of mechanical characteristics.

Patent Document 2 suppresses rolling textures and refines colonies having the rolling textures by increasing the final temperature of the hot-rolling after the addition of B. Further, by performing quenching at a temperature of higher than or equal to the lowest cooling temperature that is decided by the B amount in a run out table, recrystallization of austenite is promoted, the {110} surface strength of the rolling textures is decreased, and expansion of inclusions and ferrite crystal grains is suppressed. Thus, a method having high hole expandability and suppressing variations is proposed.

In a similar manner, as a technique of increasing the hole expandability while the strength of the steel sheet is increased, for example, Patent Document 3 discloses a technique of improving the balance between the strength and the hole expandability by optimizing the fraction of a steel structure of ferrite, bainite, or the like, and precipitates in the ferrite structure. However, the technique of Patent Document 3 does not have a sufficient hole expansion value, and does not have a sufficient balance between the strength and the hole expandability. In contrast, Patent Document 4 reveals that the hole expandability of the hot-rolled steel sheet can be improved by reducing the X-ray random intensity ratio in the {211} plane that is parallel to the rolled surface by using V as an essential element. Further, Patent Document 4 reveals that as the final rolling ending temperature is higher in the hot-rolling process, the X-ray random intensity ratio in the {211} plane is reduced more.

PRIOR ART DOCUMENT(S)

Patent Document(s)

[Patent Document 1] JP 2004-137565A
[Patent Document 2] JP 2009-24226A
[Patent Document 3] JP 2004-339606A
[Patent Document 4] JP 2010-90476A

SUMMARY OF THE INVENTION

Problem(s) to be Solved by the Invention

However, in recent years, as for automobile members that are to be used in cold areas, for example, there has been more demand for improvement in the anisotropy of mechanical characteristics and increase in the low-temperature toughness.

The present invention aims to provide a high-strength hot-rolled steel sheet having excellent hole expandability, excellent low-temperature toughness, and a tensile strength of 900 MPa or more, and a method for manufacturing the hot-rolled steel sheet.

That is, the summary of the present invention is as follows.

[1]

A hot-rolled steel sheet having a tensile strength of 900 MPa or more, the hot-rolled steel sheet consisting of, in mass %, C: greater than 0.050% and less than or equal to 0.10%,
Si: greater than or equal to 0.1% and less than or equal to 2.0%,
Mn: greater than or equal to 1.0% and less than or equal to 3.0%,
P: less than or equal to 0.1%,
S: less than or equal to 0.01%,
Al: greater than or equal to 0.005% and less than or equal to 0.05%,
N: less than or equal to 0.01%,
Ti: greater than or equal to 0.10% and less than or equal to 0.20%,
Nb: greater than or equal to 0% and less than or equal to 0.06%,
B: greater than or equal to 0% and less than or equal to 0.03%,
Ca: greater than or equal to 0% and less than or equal to 0.005%, and
the balance: Fe and impurities,
wherein an average crystal grain size is less than or equal to 7.0 μm, and
wherein an X-ray random intensity ratio in {211} <011> orientation that is parallel to a rolled surface and a rolling direction is less than or equal to 2.5.

[2]

The hot-rolled steel sheet according to [1], including one or more selected from the group consisting of, in mass %, Nb: greater than or equal to 0.001% and less than or equal to 0.06%,
B: greater than or equal to 0.0005% and less than or equal to 0.03%, and
Ca: greater than or equal to 0.0005% and less than or equal to 0.005%.

[3]

The hot-rolled steel sheet according to [1] or [2], further including:
  a Zn-plating layer or an Fe—Zn-alloy-plating layer on a surface of the hot-rolled steel sheet.

[4]

A method for manufacturing a hot-rolled steel sheet, the method including:
  performing hot-rolling on a slab having a chemical composition according to [1] or [2] at a temperature of higher than or equal to 1200° C. and lower than or equal to 1350° C.;
  ending the hot-rolling at a temperature of higher than or equal to 960° C. and lower than or equal to 1100° C.;
  within 1.0 second after the ending of the hot-rolling, starting cooling;
  cooling the hot-rolled steel sheet at an average cooling speed of greater than or equal to 80° C./second until the temperature becomes lower than the temperature at the ending of the hot-rolling by 50° C. to 200° C.; and
  winding up the hot-rolled steel sheet at a temperature of higher than or equal to 400° C. and lower than or equal to 600° C.

[5]

The method for manufacturing a hot-rolled steel sheet according to [4], further including:
  after the winding up, removing scale by acid cleaning and performing Zn-plating to form a Zn-plating layer.

[6]

The method for manufacturing a hot-rolled steel sheet having a tensile strength of 900 MPa or more, the method including:
  after the winding up of the hot-rolled steel sheet manufactured by the method according to [4], removing scale by acid cleaning;
  heating the hot-rolled steel sheet at a temperature of higher than or equal to 500° C. and lower than or equal to 650° C. in a reduction atmosphere to activate a surface of the hot-rolled steel sheet;
  immersing the hot-rolled steel sheet in a molten Zn bath at a bath temperature of higher than or equal to 430° C. and lower than or equal to 490° C. in a state in which a temperature at the time of the immersing is higher than or equal to 420° C. and lower than or equal to 500° C.; and
  adjusting a deposited amount of the Zn-plating by gas wiping.

[7]

The method for manufacturing a hot-rolled steel sheet having a tensile strength of 900 MPa or more, the method including:
  after the winding up of the hot-rolled steel sheet manufactured by the method according to [4], removing scale by acid cleaning;
  plating the hot-rolled steel sheet with Ni in greater than or equal to 0.05 g/m$^2$ and less than or equal to 3 g/m$^2$ by electrolysis;
  heating the hot-rolled steel sheet at a temperature of higher than or equal to 420° C. and lower than or equal to 500° C. in a reduction atmosphere;
  immersing the hot-rolled steel sheet in a molten Zn bath at a bath temperature of higher than or equal to 430° C. and lower than or equal to 490° C.; and
  adjusting a deposited amount of the Zn-plating by gas wiping.

[8]

The method for manufacturing a hot-rolled steel sheet according to [6] or [7], further including:
  after the gas wiping, heating the hot-rolled steel sheet at a temperature of higher than or equal to 500° C. and lower than or equal to 650° C. to form an Fe—Zn-plating layer.

Effect(s) of the Invention

According to the present invention, in a high-strength hot-rolled steel sheet having a tensile strength of 900 MPa or more, by randomizing textures of a steel sheet by increasing a hot-rolling temperature to a high temperature, the hole expandability is favorably maintained. Further, according to the present invention, by starting quenching within 1.0 second after the ending of the hot-rolling, crystal grains are refined and favorable low-temperature toughness is achieved.

MODE(S) FOR CARRYING OUT THE INVENTION

The present invention targets a high-strength hot-rolled steel sheet having a tensile strength of 900 MPa or more. As for the high-strength hot-rolled steel sheet, the present invention further aims to establish both high hole expandability and stretch such that the relation between the stamp hole expanding ratio ($\lambda$ (%)) of a steel sheet regulated in ISO 16630 and the tensile strength (TS (MPa)) of the steel sheet satisfies TS×$\lambda$≥60000 and the relation between the stretch (El (%)) of the steel sheet and the tensile strength (TS (MPa)) satisfies TS×El≥14000.

In order to achieve the improvement in the hole expandability of the high-strength steel sheet, as shown in Patent Document 4, it is effective to reduce the X-ray random intensity ratio in the {211} plane that is parallel to the rolled surface. However, as a mechanism for improving the hole expandability, the present inventors have found out that it is necessary to reduce the X-ray random intensity ratio in the {211} plane that is parallel to the rolled surface, more strictly, the X-ray random intensity ratio in {211} <011> orientation where the rolling direction becomes parallel to <011> in the {211} plane. Specifically, in the target of the present invention, which is the high-strength hot-rolled steel sheet having a tensile strength of 900 MPa or more, by setting the X-ray random intensity ratio to less than or equal to 2.5 in {211} <011> orientation, a favorable hole expandability is achieved. Further, the X-ray random intensity ratio is obtained by promoting recrystallization of austenite by increasing the final hot-rolling temperature to higher than or equal to 960° C. in the hot-rolling process.

However, as a result of increasing the final hot-rolling temperature, although the hole expandability is improved, crystal grains become coarse and the low-temperature toughness degrades. In general, quenching of the steel sheet after the hot-rolling causes crystal grains to be refined. However, when the final hot-rolling temperature is a high temperature, which is higher than or equal to 960° C., quenching of the steel sheet by usual water cooling using a run out table (ROT) of a hot-rolling line has not achieved refinement of crystal grains so as to improve the low-temperature toughness.

According to the present invention, this problem has been solved by starting quenching within 1.0 second after the ending of the final hot-rolling. That is, in the high-strength hot-rolled steel sheet having a tensile strength of 900 MPa or more, even when the final hot-rolling temperature is a high temperature, which is higher than or equal to 960° C., by starting quenching within 1.0 second after the ending of the final hot-rolling, crystal grains are refined to less than or equal to 7.0 μm. Accordingly, it becomes possible to improve the low-temperature toughness and to set a ductile-brittle transition temperature to lower than or equal to −40° C.

Details of the present invention will be described below.

First, the chemical composition of the steel sheet according to the present invention will be described. Note that % in the chemical composition means mass %.

A hot-rolled steel sheet according to the present invention consists of, in mass %, C: greater than 0.050% and less than or equal to 0.10%, Si: greater than or equal to 0.1% and less than or equal to 2.0%, Mn: greater than or equal to 1.0% and less than or equal to 3.0%, P: less than or equal to 0.1%, S: less than or equal to 0.01%, Al: greater than or equal to 0.005% and less than or equal to 0.05%, N: less than or equal to 0.01%, Ti: greater than or equal to 0.10% and less than or equal to 0.20%, Nb: greater than or equal to 0% and less than or equal to 0.06%, B: greater than or equal to 0% and less than or equal to 0.03%, Ca: greater than or equal to 0% and less than or equal to 0.005%, and the balance: Fe and impurities.

C is an effective element in increasing the strength. If the C content is less than or equal to 0.050%, it will become difficult to secure the desired strength. Accordingly, the C content is greater than 0.050%, preferably greater than or equal to 0.06%. Meanwhile, if the C content is greater than 0.10%, carbides will be produced so that the processability will degrade. Accordingly, the C content is less than or equal to 0.10%.

Si is necessary for preliminary deoxidation and is effective in increasing the strength as a dissolution enhancing element. If the Si content is less than 0.1%, it will become difficult to secure the desired strength. Accordingly, the Si content is greater than or equal tp 0.1%. Meanwhile, if the Si content is greater than 2.0%, the transformation point will become an excessively high temperature, so that it will become difficult to suppress residual rolling textures before recrystallization of austenite, even when the following manufacturing method is applied. Accordingly, the Si content is less than or equal to 2.0%.

Mn is effective in increasing the strength as a dissolution enhancing element. If the Mn content is less than 1.0%, it will become difficult to secure the desired strength. Accordingly, the Mn content is greater than or equal to 1.0%. Further, in a case in which an element other than Mn, such as Ti, which suppresses the generation of a hot crack due to S, is not added sufficiently, it is desirable to set the Mn content so as to satisfy Mn/S>20 in mass %. Meanwhile, if the Mn content is greater than 3.0%, a crack may be generated in a slab. Accordingly, the Mn content is less than or equal to 3.0%.

P is an element that is usually contained as an impurity. If the P content exceeds 0.1%, the processability and the weldability will be adversely affected, and in addition, the fatigue characteristics will degrade. Accordingly, the P content is less than or equal to 0.1%. The P content is preferably less than or equal to 0.02% to be used for a suspension member of an automobile, which is formed in a harsh manner and needs high fatigue characteristics. In the present invention, although the P content may be 0%, it is difficult to reduce the P content to less than 0.001% by the current common refinement (including secondary refinement). Accordingly, the lower limit may be 0.001%.

S is an element that is contained as an impurity. If the S content is greater than 0.01%, a coarse inclusion such as MnS will be formed to degrade the formability. Accordingly, the S content is less than or equal to 0.01%. In order that S can stand harsh formation to be used for a member that is subjected to harsh processing, the S content is preferably less than or equal to 0.005%. In the present invention, although the S content may be 0%, it is difficult to reduce the S content to less than 0.0005% by the current common refinement (including secondary refinement). Accordingly, the lower limit may be 0.0005%.

Al is necessary for deoxidation of a melted steel. If the Al content is less than 0.005%, it will be difficult to obtain the deoxidation effects. Accordingly, the Al content is greater than or equal to 0.005%. Meanwhile, if the Al content is greater than 0.05%, the transformation point will become an excessively high temperature, so that it will become difficult to suppress to suppress residual rolling textures before recrystallization of austenite, even when the following manufacturing method is applied. Accordingly, the Al content is less than or equal to 0.05%.

N is an element that is contained as an impurity. N forms precipitates with Ti and Nb at a higher temperature than C does, so as to consume these elements that increase the strength by forming precipitates by being coupled with C. Further, N forms BN by being coupled with B that has a function of increasing the toughness by increasing the grain-boundary strength in a dissolved state. Therefore, N reduces Ti and B that are effective in fixing the consumption and also forms Ti nitrides having a large size so as to increase variations of the hole expanding ratio. Accordingly, it is preferable to reduce N as much as possible, and an acceptable range is less than or equal to 0.01%. The N content is preferably 0.005%. In the present invention, although the N content may be 0%, it is difficult to reduce the N content to less than 0.0005% by the current common refinement (including secondary refinement). Accordingly, the lower limit may be 0.0005%.

Ti is one of the most important elements in the present invention. That is, Ti not only contributes to an increase in the strength of the steel sheet by precipitation strengthening, but also detoxifies extended inclusions such as MnS by precipitation of TiS so as to increase the low-temperature toughness and the hole expandability. If the Ti content is less than 0.10%, it becomes difficult to secure the desired strength. Accordingly, the Ti content is greater than or equal to 0.10%. Meanwhile, even if the Ti content is greater than 0.20%, the effect of this function will saturate and the cost of the alloy will be increased. Accordingly, the Ti content is less than or equal to 0.20%.

The hot-rolled steel sheet according to the present invention may include, in addition to the above basic component composition, one or more of Nb: 0 to 0.06%, B: 0 to 0.03%, and Ca: 0 to 0.005% in mass %.

Since Nb is an element that has a function of increasing the strength of the steel sheet by precipitation strengthening, Nb may be included. However, even if the Nb content is greater than 0.06%, this effect will saturate. Accordingly, the Nb content is less than or equal to 0.06%. Note that the Nb content is preferably greater than or equal to 0.001% in order to obtain the effect of this function more surely.

Since B has a function of increasing the grain-boundary strength and the toughness, B may be included. However, even if the B content is greater than 0.03%, this effect will saturates. Accordingly, the B content is less than or equal to 0.03%, preferably less than or equal to 0.003%. Note that the B content is preferably greater than or equal to 0.0005% in order to obtain the effect of this function more surely.

Ca has a function of dispersing a large number of fine oxides in deoxidation of melted steel and of refining the structure. Further, Ca has a function of increasing the hole expandability by fixing S in the steel as spherical CaS in desulfurization of the melted steel and by suppressing the generation of extended inclusions such as MnS. Accordingly, Ca may be included. However, even if the Ca content is greater than 0.005%, this effect will saturate. Accordingly, the Ca content is less than or equal to 0.005%. Note that the Ca content is preferably greater than or equal to 0.0005% in order to obtain the effect of this function more surely.

The balance is Fe and impurities.

Next, the micro structure of the steel sheet according to the present invention will be described.

In the steel sheet according to the present invention, it is necessary that the X-ray random intensity ratio in {211} <011> orientation that is parallel to the rolled surface and the rolling direction is less than or equal to 2.5. The X-ray random intensity ratio means a value of a ratio of X-ray diffraction intensity (X-ray diffraction intensity in {211} <011> orientation that is parallel to the rolled surface and the rolling direction) of a hot-rolled steel sheet sample that is a measurement target, with respect to X-ray diffraction intensity of a powder sample (powder sample that does not have congregation in specific orientation) having random orientation distribution in X-ray diffraction measurement. The hole expandability of the hot-rolled steel sheet degrades more as the X-ray random intensity ratio in {211} <011> orientation that is parallel to the rolled surface and the rolling direction is higher. When the X-ray random intensity ratio is less than or equal to 2.5, the relation between the hole expanding ratio ($\lambda$ (%)) regulated in ISO 16630 and the tensile strength (TS (MPa)) of the steel sheet satisfies TS×$\lambda$≥60000 and the relation between the stretch (El (%)) of the steel sheet and the tensile strength (TS (MPa)) satisfies TS×El≥14000, so that a high hole expandability and stretch are achieved.

The X-ray random intensity ratio is obtained by measuring the X-ray diffraction intensity in {211} <011> orientation that is parallel to the rolled surface and the rolling direction by a diffractometer method using an appropriate X-ray tube, for example, and comparing the obtained X-ray diffraction intensity with an X-ray diffraction intensity of a random sample (powder sample). In a case in which the measuring by X-ray diffraction is difficult, by using an electron backscatter diffraction (EBSD) pattern, a region may be measured where the measurement interval between pixels is 1/5 or less of the average crystal grain size and 5000 or more crystal grains can be measured, so as to measure a random intensity ratio from a pole figure or orientation distribution function (ODF) distribution.

In the hot-rolled steel sheet, as the X-ray random intensity ratio in {211} <011> orientation that is parallel to the rolled surface and the rolling direction is higher, the anisotropy of the steel sheet becomes higher. In particular, when a plastic strain ratio (r-value) in the rolling direction, a plastic strain ratio (r-value) in 45° direction with respect to the rolling direction, and a plastic strain ratio (r-value) in 90° direction (width direction of the sheet) with respect to the rolling direction are represented as $r_0$, $r_{45}$, and $r_{90}$, respectively, in the above case, the difference between $r_0$ and $r_{45}$ and the difference between $r_0$ and $r_{90}$ become larger and $r_{90}$ becomes much smaller. Accordingly, at the time of hole expanding forming, the reduction in sheet thickness becomes large in an end surface in the rolling direction, which is subjected to tensile strain in the width direction, and a high stress is generated in the end surface so that a crack is easily generated and propagated. Thus, in a case in which the X-ray random intensity ratio in {211} <011> orientation that is parallel to the rolled surface and the rolling direction is high, the hole expanding ratio may degrade.

The steel sheet according to the present invention has an average crystal grain size of less than or equal to 7.0 μm. By refining the crystal grains of the steel sheet and setting the average crystal grain size to less than or equal to 7.0 μm, it is possible to set the ductile-brittle transition temperature to lower than or equal to −40° C.

The "average crystal grain size" in the present invention is defined in the following manner by performing analysis using the electron backscatter diffraction (EBSD) pattern (scanning electron microscope-crystal orientation analysis). In a case in which the crystal orientation angle difference between adjacent pixels measured by using the EBSD in a part in a depth of 1/4 of the sheet thickness is 5° or more, the boundary between the pixels is regarded as the grain boundary. By defining the grain boundary in this manner, and a region surrounded by the grain boundaries is regarded as a crystal grain. Then, the diameter of a circle having the same area as the area (the area of a part surrounded by the grain boundaries) of the part that is regarded as the crystal grain is regarded as the crystal grain size. The "average crystal grain size" is the average of the crystal grain sizes, which is obtained by calculating the average value by using an area fraction method.

Note that, in the EBSD analysis, for example, crystal orientation is measured in a depth of less than or equal to 0.5 μm at a 1500-fold magnification, and a position at which the orientation difference between adjacent measurement points (pixels) exceeds 5° is regarded as the boundary (grain boundary) of crystal grains. Further, the region surrounded by the grain boundaries is regarded as the crystal grain.

The average crystal grain size in the part in the depth of 1/4 of the sheet thickness is obtained from the following reason. By setting the average crystal grain size to less than or equal to 7.0 μm in as many points as possible in the thickness, including the part in the depth of 1/4 of the sheet thickness, the low-temperature toughness is further increased. However, by measuring the average crystal grain size in the part in the depth of 1/4 from the surface of the steel sheet, a generally typical material property of the entire steel sheet can be obtained. Accordingly, the part in the depth of 1/4 of the sheet thickness is set as the measurement point.

The steel sheet according to the present invention may include a Zn-plating layer or an Fe—Zn-alloy-plating layer on the surface thereof. The Zn-plating layer may be formed of substantially pure Zn by electrolysis or may contain 0.1 to 0.5 mass % Al by immersing the steel sheet in a molten Zn bath. The Fe—Zn-alloy-plating layer may contain 7 to 15 mass % Fe by immersing the steel sheet in a molten Zn bath and then heating the steel sheet so as to diffuse Fe in the plating layer.

Next, the method for manufacturing the hot-rolled steel sheet according to the present invention will be described.

At the time of the hot-rolling of a slab having the above chemical composition according to the present invention, the temperature of the slab is set to higher than or equal to 1200° C. and lower than or equal to 1350° C. If the temperature of the slab to be used for the hot-rolling is lower than 1200° C., precipitates containing Ti and Nb will not be dissolved in the slab sufficiently and become coarse, so that the precipitation strengthening capability by the precipitates of Ti and Nb will not be obtained. In addition, these coarse precipitates will keep remaining in the steel sheet, so that the hole expandability will degrade. Meanwhile, in order to prevent the structure from becoming coarse, the temperature of the slab used for the hot-rolling is set to lower than or equal to 1350° C.

After setting the temperature of the slab to higher than or equal to 1200° C. and lower than or equal to 1350° C., the hot-rolling is performed. In the present invention, in order to prevent residual rolling textures before recrystallization, the rolling textures causing the X-ray random intensity ratio in {211} <011> orientation to be increased, the hot-rolling ends at a temperature of higher than or equal to 960° C., preferably higher than or equal to 1000° C. Meanwhile, in order to prevent the average crystal grain size from becoming greater than 7.0 μm by coarsening of the structure, the hot-rolling ends at a temperature of lower than or equal to 1100° C.

The X-ray random intensity ratio in {211} <011> orientation is reduced more as the ending temperature of the hot-rolling in the hot-rolling process is higher. The X-ray random intensity ratio in {211} <011> orientation is increased when strains due to rolling are stored in the steel sheet without generating recrystallization after the hot-rolling. Accordingly, in a case in which the ending temperature of the hot-rolling is high, recrystallization is promoted after the ending of the hot-rolling, and accordingly, the X-ray random intensity ratio in {211} <011> orientation may be reduced.

After the ending of the hot-rolling, within 1.0 second, quenching is started. The quenching is continued at an average cooling speed of 80° C./second or more until the temperature becomes lower than the temperature at the time of the ending of the hot-rolling by 50 to 200° C. In the present invention, since the ending temperature of the hot-rolling is high, which is higher than or equal to 960° C., if the quenching is started when a time period of longer than 1.0 second passes after the ending of the hot-rolling, crystal grains will not be refined sufficiently. By starting the quenching within 1.0 second after the ending of the hot-rolling, crystal grains are refined so as to improve the low-temperature toughness.

In the present invention, within 1.0 second after the ending of the hot-rolling, the quenching is started. This quenching is continued at an average cooling speed of 80° C./second or more until the temperature becomes lower than the ending temperature of the hot-rolling by 50 to 200° C.

If the cooling speed in this quenching is slower, the structure after recrystallization of austenite fails to be frozen, and grains will grow during the cooling. When the average cooling speed is 80° C./second or more in the quenching, such a problem does not arise. Further, if the ending temperature of the quenching is too high, the steel sheet will be subjected to high temperatures at which grains can grow even after the quenching ends, and accordingly, coarse grains will be formed and the toughness will degrade. In contrast, if the ending temperature of the quenching is too low, the temperature passes through the transformation point rapidly, and accordingly, a hard phase will be formed and an excellent hole expandability cannot be obtained. When the ending temperature of the quenching is in a range where the temperature is lower than the ending temperature of the hot-rolling by 50 to 200° C., such a problem does not arise.

By starting the quenching as immediately as possible after the ending of the hot-rolling, the growth of crystal grains can be suppressed preferentially. On the other hand, if the quenching is started when a certain time period passes after the ending of the hot-rolling, crystal orientation is more randomized by recrystallization. The starting time of the quenching may be decided as appropriate within 1.0 second after the ending of the hot-rolling, depending on whether to give priority to the suppression of the growth of crystal grains or to randomization of crystal orientation.

Note that the quenching after the ending of the hot-rolling is desirably started after a time period of 0.01 seconds passes after the ending of the hot-rolling in order to promote randomization of crystal orientation by recrystallization. The quenching is preferably started after a time period of 0.05 seconds, more preferably 0.1 seconds, passes after the ending of the hot-rolling.

The upper limit of the average cooling speed at the quenching is not limited to a particular value; however, by the limitation of equipment, the actual upper limit is about 1000° C./second.

After the ending of the quenching, cooling is performed by using the run out table, and the steel sheet is wound up at a steel sheet temperature of 400 to 600° C. The cooling after the ending of the quenching until the winding is preferably performed at, but not particularly limited to, an average cooling speed of 20° C./second or more.

In the present invention, by controlling the form of Ti precipitates, the strength is increased. By setting the winding temperature to lower than or equal to 600° C., the strength is increased. Note that a too low winding temperature does not generate precipitates and the strength is not increased sufficiently. Therefore, the winding temperature is higher than or equal to 400° C.

In the present invention, the Zn-plating layer or the Fe—Zn-alloy-plating layer may be formed on the surface of the steel sheet by a known plating method. For example, to form the Zn-plating layer, after the wound steel sheet is cooled to room temperature, acid cleaning may be performed to remove scale, and then Zn plating may be performed by electrolysis in a sulphate bath. Alternatively, Zn plating may be performed by immersing the steel sheet in a hot dip galvanizing bath containing 0.1 to 0.5 mass % Al. The deposited amount of Zn plating is adjusted by gas wiping.

In a case of forming the Zn-plating layer by immersing the steel sheet in a hot dip galvanizing bath, it is necessary to secure wettability of plating. Therefore, in general, the steel sheet from which scale is removed by acid cleaning is heated in a reduction atmosphere so as to activate the surface, and then the steel sheet is immersed in the hot dip galvanizing bath. In this case, in order to perform Zn-plating while the material property of the steel sheet is maintained, the heating is performed at lower than or equal to 650° C. in a reduction atmosphere. Further, since the heating temperature of lower than 500° C. cannot secure sufficient wettability, the lower limit of the heating in the reduction atmosphere is 500° C.

After the scale is removed by acid cleaning, in a case of performing Ni-plating by electrolysis, the steel sheet is heated in a reduction atmosphere to a temperature close to the hot dip galvanizing bath temperature and then is immersed in the hot dip galvanizing bath so as to secure wettability. In this case, if the Ni-plating amount is less than 0.05 g/m$^2$, it will be difficult to obtain sufficient wettability. Further, if the Ni-plating amount is greater than 3 g/m$^2$, the effect of increasing wettability will saturate. Accordingly, the Ni-plating amount is preferably greater than or equal to 0.05 g/m$^2$ and less than or equal to 3 g/m$^2$.

As in a case without Ni-plating, the heating after Ni-plating is preferably performed at a temperature of lower than or equal to 650° C. because the temperature exceeding 650° C. prevents the material property of the base material from being maintained. If the temperature of the steel sheet is lower than the melting point of Zn at the time of immersion in the hot dip galvanizing bath, the surface of the bath will be solidified instantaneously, and a uniform appearance will not be obtained. Therefore, it is preferable that the temperature of the steel sheet is higher than or equal to 420° C. at the instance of immersion in the hot dip galvanizing bath. Further, if the steel sheet is immersed at temperatures of greater than 500° C., alloying reaction will progress in the hot dip galvanizing bath, and the plating adhesion will be decreased. Therefore, it is preferable that the temperature of the steel sheet is lower than or equal to 500° C. at the instant of immersion.

If the temperature of the hot dip galvanizing bath is lower than 430° C., the temperature is close to the melting point of Zn, so that a part that is exposed to an open air might be solidified and a stable manufacture becomes difficult. Accordingly, the temperature of the hot dip galvanizing bath is preferably higher than or equal to 430° C. Since the steel sheet is kept at the temperature of the hot dip galvanizing bath while being immersed in the hot dip galvanizing bath, the temperature of the plating bath has a greater influence on alloying in the bath than the temperature of the steel sheet at the time of entering the bath (hereinafter referred to as "entering sheet temperature"). If the temperature of the hot dip galvanizing bath is higher than 490° C., alloying will progress easily in the bath. Since the progress of alloying in the bath decreases the plating adhesion, the temperature of the hot dip galvanizing bath is preferably lower than or equal to 490° C.

The Fe—Zn-alloy-plating layer can be formed on the surface of the steel sheet by immersing the steel sheet in the molten Zn bath and performing gas wiping, and then by heating the steel sheet so as to diffuse Fe in the Zn-plating layer. In the alloyed hot dip galvanizing, the Fe diffusion amount into the Zn-plating layer is preferably 7 to 15 mass %. Alloying conditions that are necessary for this are different depending on the component of the steel sheet, the crystal grain size, the Al concentration in the plating bath, and the like. If the heating is performed at a temperature of lower than 500° C., alloying will need a long time. Accordingly, considering productivity, the heating temperature is preferably higher than or equal to 500° C. Further, if the heating is performed at a temperature of higher than 650° C., the material property of the base material will be changed. Accordingly, the upper limit of the heating temperature is 650° C. Furthermore, if the heating time is shorter than four seconds, uniform alloying is difficult. Accordingly, the heating time is longer than or equal to four seconds. In addition, a heating time of longer than 60 seconds is not reasonable in terms of productivity in a continuous steel sheet line.

Accordingly, the upper limit of the heating time is preferably 60 seconds.

EXAMPLES

Example 1

Several types of steel containing the components shown in Table 1 were smelted and subjected to continuous casting to be a slab having a thickness of 230 mm each. Then, each slab was heated to a temperature of 1250 to 1280° C., subjected to rough rolling and final rolling by a continuous hot-rolling apparatus, cooled by water under certain conditions, subjected to radiational cooling, cooled by water again, and then wound up. Thus, hot-rolled steel sheets were manufactured. Table 2 shows numbers of the types of steel used, conditions for the hot-rolling, and thicknesses of steel sheets. In Table 2, "FT" represents the ending temperature of the final rolling, "Cooling starting time" represents the time period from the ending of the final rolling to the starting of the cooling by water, "Cooling speed" represents the average cooling speed of the cooling by water, and "Cooling amount" represents the difference between the steel sheet temperature at the time of the ending of the cooling by water and the ending temperature of the final rolling. "CT" represents the winding temperature.

As for tensile tests of the steel sheets, yield strength (YP (MPa)), tensile strength (TS (MPa)), and stretch (El (%)) were evaluated by extracting test pieces of JIS No. 5 in the width direction (C direction) of the steel sheets. As for Lankford values (r-value), a plastic strain ratio (r-value) in 0° direction with respect to the rolling direction, a plastic strain ratio (r-value) in 45° direction with respect to the rolling direction, and a plastic strain ratio (r-value) in 90° direction (width direction of the sheet) with respect to the rolling direction are represented as $r_0$, $r_{45}$, and $r_{90}$, respectively. Further, $\Delta r$ was evaluated on the basis of the following expression.

$$\Delta r = (r_0 + r_{90} - 2 \times r_{45})/2$$

As for the measurement of the ductile-brittle transition temperature, Charpy impact tests were conducted on V-notch test pieces each having 2.5 mm sub-size regulated in JIS Z 2242, and the temperature at which the percent brittle fracture becomes 50% is set as the ductile-brittle transition temperature. As for steel sheets having a final thickness of less than 2.5 mm, the whole thickness was used for the measurement. Steel sheets having ductile-brittle transition temperatures of lower than −40° C. were regarded as successful samples.

As for the hole expanding ratio ($\lambda$ (%)), evaluation was performed according to the method regulated in ISO 16630. Steel sheets having TS×$\lambda$≥60000 as the relation between the hole expanding ratio ($\lambda$ (%)) and the tensile strength (TS (MPa)) of the steel sheet and TS×El≥14000 as the relation between the stretch (El (%)) of the steel sheet and the tensile strength (TS (MPa)) were regarded as successful samples.

As for textures, X-ray random intensity ratios in {211} <011> orientation that is parallel to the rolled surface and the rolling direction in a ¼ part of the sheet thickness were evaluated. By using the electron backscatter diffraction (EBSD) pattern, measurement was performed on a region where the measurement interval between pixels is ⅕ or less of the average crystal grain size and 5000 or more crystal grains can be measured. Steel sheets having a random intensity ratio of 2.5 or less obtained from orientation distribution function (ODF) distribution were regarded as successful samples.

As for the average crystal grain size of the steel sheet, the average crystal grain size was measured by using the electron backscatter diffraction (EBSD) pattern, on a region where the measurement interval between pixels is ⅕ or less of the average crystal grain size and 1000 or more crystal grains can be measured in a ¼ part of the sheet thickness. Then, when a 5° or more crystal orientation angle difference between adjacent pixels is regarded as a grain boundary, the diameter of a circle having the same area as the area of the crystal grain represents the grain size, and the average value was calculated by the area fraction method.

Table 2 shows the evaluation results. Numerical numbers not within the range of the present invention are underlined.

TABLE 1

| Type of steel | Chemical composition (unit: mass %, the balance: Fe and impurities) | | | | | | | | | | |
|---|---|---|---|---|---|---|---|---|---|---|---|
| | C % | Si % | Mn % | P % | S % | Al % | N ppm | Ti % | B ppm | Nb % | Ca ppm |
| A | 0.051 | 1.20 | 2.50 | 0.010 | 0.002 | 0.030 | 30 | 0.160 | | | |
| B | 0.064 | 1.17 | 2.46 | 0.007 | 0.004 | 0.045 | 36 | 0.158 | | 0.022 | 21 |
| C | 0.062 | 0.42 | 1.58 | 0.006 | 0.003 | 0.028 | 28 | 0.110 | | 0.033 | |
| D | 0.098 | 0.53 | 1.12 | 0.007 | 0.006 | 0.043 | 34 | 0.128 | 12 | | |
| E | 0.058 | 0.87 | 1.98 | 0.009 | 0.004 | 0.032 | 42 | 0.180 | 10 | | 16 |
| F | 0.061 | 1.01 | 2.61 | 0.015 | 0.003 | 0.038 | 51 | 0.174 | 9 | 0.041 | |
| G | 0.072 | 1.80 | 2.23 | 0.023 | 0.008 | 0.027 | 39 | 0.163 | | | 11 |
| H | 0.062 | 1.02 | 1.80 | 0.007 | 0.006 | 0.043 | 34 | 0.060 | | | |

TABLE 2

| | No. | Type of steel | History of hot-rolling | | | | | Tensile test (JIS No. 5) C direction | | | |
|---|---|---|---|---|---|---|---|---|---|---|---|
| | | | FT °C. | Cooling starting times | Cooling speed °C./s | Cooling amount °C. | CT (°C.) | Thickness (mm) | YP (MPa) | TS (MPa) | EI (%) |
| Comparative example | 1 | A | 891 | 1.4 | 30 | 15 | 541 | 3.7 | 805 | 967 | 15.6 |
| | 2 | A | 903 | 0.7 | 25 | 300 | 553 | 3.6 | 776 | 982 | 15.8 |
| | 3 | A | 1048 | 0.1 | 30 | 15 | 421 | 3.7 | 803 | 978 | 13.0 |
| Invention example | 4 | A | 1053 | 0.7 | 80 | 50 | 470 | 3.7 | 860 | 967 | 15.0 |
| | 5 | A | 1035 | 0.1 | 150 | 80 | 401 | 3.7 | 873 | 983 | 16.3 |
| Comparative example | 6 | A | 1013 | 1.4 | 24 | 15 | 543 | 3.6 | 892 | 1018 | 14.2 |
| Invention example | 7 | A | 976 | 0.1 | 160 | 80 | 461 | 3.8 | 862 | 1003 | 15.2 |
| Comparative example | 8 | B | 931 | 1.4 | 31 | 10 | 581 | 2.9 | 787 | 981 | 15.8 |
| | 9 | B | 946 | 1.2 | 28 | 13 | 554 | 2.9 | 789 | 993 | 14.8 |
| | 10 | B | 976 | 1.3 | 29 | 16 | 495 | 2.8 | 842 | 1001 | 14.2 |
| Invention example | 11 | B | 1063 | 0.7 | 88 | 57 | 484 | 2.9 | 831 | 991 | 15.8 |
| Comparative example | 12 | B | 974 | 1.4 | 28 | 15 | 496 | 3.0 | 838 | 994 | 14.6 |
| Invention example | 13 | B | 994 | 0.6 | 89 | 80 | 546 | 2.9 | 813 | 968 | 15.8 |
| | 14 | B | 1007 | 0.1 | 148 | 115 | 551 | 2.9 | 864 | 991 | 18.4 |
| Comparative example | 15 | B | 1042 | 1.3 | 25 | 15 | 535 | 2.9 | 851 | 995 | 17.8 |
| Invention example | 16 | B | 1043 | 0.7 | 92 | 80 | 500 | 2.8 | 882 | 989 | 14.9 |
| | 17 | B | 963 | 0.1 | 155 | 112 | 503 | 2.8 | 859 | 966 | 15.0 |
| Comparative example | 18 | C | 991 | 0.1 | 102 | 10 | 496 | 2.6 | 836 | 961 | 14.8 |
| Invention example | 19 | C | 963 | 0.7 | 81 | 65 | 544 | 2.6 | 854 | 1018 | 14.4 |
| Comparative example | 20 | C | 981 | 1.3 | 18 | 123 | 548 | 2.6 | 876 | 1020 | 15.3 |
| Invention example | 21 | C | 996 | 0.7 | 88 | 118 | 528 | 2.6 | 884 | 991 | 18.1 |
| Comparative example | 22 | D | 933 | 0.7 | 88 | 57 | 550 | 2.5 | 899 | 1008 | 14.1 |
| Invention example | 23 | D | 1051 | 0.2 | 102 | 103 | 501 | 2.5 | 860 | 967 | 15.0 |
| Invention example | 24 | E | 1024 | 0.1 | 115 | 85 | 552 | 2.6 | 881 | 1011 | 14.8 |
| | 25 | F | 1038 | 0.1 | 135 | 93 | 526 | 2.9 | 806 | 961 | 16.0 |
| | 26 | G | 999 | 0.2 | 83 | 153 | 547 | 2.8 | 918 | 1018 | 15.6 |
| Comparative example | 27 | H | 1023 | 0.2 | 102 | 115 | 558 | 2.9 | 751 | 883 | 18.0 |

| | No. | Texture {211}<011> × random | Average crystal grain size d μm | r-value (strain: 3%) | | | | Hole expanding ratio λ (%) | TS × λ MPa × % | TS × EI MPa × % | Charpy test Transition temp. °C. |
|---|---|---|---|---|---|---|---|---|---|---|---|
| | | | | Δr | 0 | 45° | 90° | | | | |
| Comparative example | 1 | 5.0 | 4.4 | −0.24 | 0.60 | 0.96 | 0.85 | 50 | 48737 | 15085 | −62 |
| | 2 | 6.4 | 5.1 | −0.37 | 0.52 | 0.98 | 0.70 | 52 | 50671 | 15516 | −81 |
| | 3 | 1.7 | 8.9 | −0.04 | 0.71 | 0.78 | 0.77 | 88 | 85673 | 12714 | −3 |
| Invention example | 4 | 2.2 | 6.2 | −0.11 | 0.77 | 0.90 | 0.81 | 90 | 87030 | 14505 | −53 |
| | 5 | 2.3 | 6.1 | −0.15 | 0.71 | 0.83 | 0.65 | 85 | 83752 | 16023 | −48 |

TABLE 2-continued

| | No. | | | | | | | | | | |
|---|---|---|---|---|---|---|---|---|---|---|---|
| Comparative example | 6 | 1.5 | 8.1 | −0.06 | 0.73 | 0.81 | 0.78 | 86 | 87955 | 14456 | <u>−15</u> |
| Invention example | 7 | 1.4 | 5.9 | −0.13 | 0.68 | 0.95 | 0.97 | 71 | 71213 | 15246 | −68 |
| Comparative example | 8 | 2.8 | 4.3 | −0.42 | 0.67 | 1.18 | 0.85 | 46 | 44734 | 15500 | −80 |
| | 9 | 2.9 | 4.5 | −0.45 | 0.71 | 1.22 | 0.83 | 49 | 48856 | 14696 | −81 |
| | 10 | 2.1 | 7.9 | −0.11 | 0.83 | 0.99 | 0.93 | 54 | 54054 | 14214 | <u>−12</u> |
| Invention example | 11 | 1.0 | 6.5 | −0.09 | 0.85 | 1.00 | 0.98 | 83 | 82253 | 15658 | −65 |
| Comparative example | 12 | 1.3 | 8.1 | −0.04 | 0.95 | 1.01 | 0.99 | 52 | 51290 | 14512 | <u>−25</u> |
| Invention example | 13 | 0.8 | 6.5 | 0.01 | 0.87 | 0.91 | 0.97 | 76 | 73181 | 15294 | −61 |
| | 14 | 0.8 | 6.1 | −0.11 | 0.88 | 1.02 | 0.95 | 73 | 72541 | 18234 | −51 |
| Comparative example | 15 | 0.8 | 9.0 | 0.00 | 0.89 | 0.94 | 0.99 | 90 | 89550 | 17711 | <u>15</u> |
| Invention example | 16 | 0.9 | 6.7 | −0.02 | 0.85 | 0.92 | 0.95 | 73 | 72197 | 14736 | −55 |
| | 17 | 1.1 | 5.7 | −0.03 | 0.85 | 0.91 | 0.91 | 79 | 76314 | 14490 | −62 |
| Comparative example | 18 | 1.2 | 9.0 | −0.14 | 0.84 | 1.05 | 0.99 | 66 | 63426 | 14223 | <u>−13</u> |
| Invention example | 19 | 1.8 | 5.8 | −0.20 | 0.81 | 1.08 | 0.95 | 70 | 70853 | 14659 | −71 |
| Comparative example | 20 | 1.2 | 8.7 | −0.11 | 0.83 | 0.99 | 0.93 | 64 | 64872 | 15606 | <u>−23</u> |
| Invention example | 21 | 1.0 | 5.1 | −0.09 | 0.85 | 1.00 | 0.98 | 74 | 73730 | 17937 | −65 |
| Comparative example | 22 | 3.5 | 4.2 | −0.46 | 0.65 | 1.15 | 0.73 | 49 | 49594 | 14213 | −75 |
| Invention example | 23 | 1.1 | 5.1 | −0.03 | 0.85 | 0.91 | 0.91 | 84 | 81228 | 14505 | −62 |
| Invention example | 24 | 1.3 | 4.7 | −0.09 | 0.74 | 0.85 | 0.78 | 78 | 78858 | 14963 | −72 |
| | 25 | 1.6 | 4.1 | −0.08 | 0.64 | 0.78 | 0.76 | 82 | 78418 | 15376 | −61 |
| | 26 | 1.8 | 4.4 | −0.04 | 0.89 | 0.94 | 0.91 | 73 | 74314 | 15881 | −78 |
| Comparative example | 27 | 1.3 | 5.1 | −0.02 | 0.85 | 0.92 | 0.95 | 65 | 57395 | 15894 | −81 |

Each steel sheet according to the present invention examples has an X-ray random intensity ratio of 2.5 or less, a TS×λ value of 60000 or more in the evaluation of the hole expandability, and a TS×El value of 14000 or more in the evaluation of the ductility. Thus, each steel sheet according to the present invention examples has favorable hole expandability and ductility. Further, the average crystal grain size of each steel sheet according to the present invention examples is 7.0 μm or less. Thus, each steel sheet according to the present invention examples has favorable low-temperature toughness by having the ductile-brittle transition temperature of lower than or equal to −40° C.

Furthermore, each steel sheet according to the present invention examples has satisfied preferable conditions of the present invention as to the manufacturing method. As a result, preferable values of the present invention as to the X-ray random intensity ratio, the average crystal grain size, and the ductile-brittle transition temperature were secured.

As for each of Comparative examples 1, 2, 8, 9, and 22, the final temperature was lower than 960° C., the X-ray random intensity ratio exceeded 2.5, and the evaluation on the hole expandability was poor. As for each of Comparative examples 3, 6, 10, 12, 15, 18, and 20, although the final temperature was higher than or equal to 960° C., cooling conditions after the final rolling was not within the range of the present invention, and the average crystal grain size and the ductile-brittle transition temperature were not within the range of the present invention. As for Comparative example 27, the Ti content was not within the range of the present invention, and the evaluation on the tensile strength was poor.

Each steel sheet according to the present invention examples and comparative examples contains Ti in the range of the present invention, and the winding temperature is higher than or equal to 400° C. and lower than or equal to 600° C. Accordingly, the tensile strength is greater than or equal to 900 MPa, which is the high strength desired in the present invention.

Example 2

On the hot-rolled steel sheets according to the present invention examples shown in Example 1, plating layers were formed by the following two methods I and II. Plating original sheets (hot-rolled steel sheet manufacturing method numbers) in Table 3 show which hot-rolled steel sheet in the present invention examples in Example 1 was used.

Method I: Scale on the hot-rolled steel sheet was removed by acid cleaning, and the hot-rolled steel sheet was dried immediately. By heating the hot-rolled steel sheet in a 4% $H_2$—$N_2$ atmosphere under the conditions shown as "Activation conditions" in Table 3, the surface of the steel sheet was reduced and wettability of plating was increased. The steel sheet was immersed in a molten Zn plating bath, and the deposited amount was adjusted gas wiping.

The heating temperature and holding time shown in the "Activation conditions" in Table 3 are defined as follows. The holding time corresponds to the period in which the temperature is kept between the highest temperature during activation processing and a temperature that is lower than the highest temperature by 20° C., and the heating temperature corresponds to the highest temperature. The temperature at which the steel sheet entered the plating bath was adjusted as shown in "Entering sheet temp." in Table 3.

Method II: Scale on the hot-rolled steel sheet was removed by acid cleaning, and the hot-rolled steel sheet was dried immediately. Ni-plating in the amounts shown in Table 3 was performed by electrolysis. The sheet was heated in a 4% $H_2$—$N_2$ atmosphere, immersed in a molten Zn plating bath, and the deposited amount was adjusted by gas wiping.

In this method, in the heating during activation processing, after the temperature of the steel sheet became the highest temperature, in some cases, the steel sheet is immersed in a plating bath before the temperature is decreased by 20° C. In those cases, at the time when the steel sheet was immersed in the plating bath, the holding was regarded as being ended even if the sheet temperature was not decreased from the highest temperature by 20° C.

After plating by Methods I and II, some of the steel sheets were subjected to alloying processing under heating conditions shown as "Alloying conditions" in Table 3. The heating temperature and holding time shown in the "Alloying conditions" are defined as follows. The holding time corresponds to the period in which the temperature is kept between the highest temperature during the alloying processing and a temperature that is lower than the highest temperature by 20° C., and the heating temperature corresponds to the highest temperature. Steel sheets having the Zn-plating layer or the Fe—Zn-alloy-plating layer on the surface were evaluated in the same manner as in Example 1, and the presence and absence of un-plated parts were determined. Steel sheets having no un-plated parts in this evaluation are expected to have high corrosion resistance. Table 3 shows obtained characteristics of the plated steel sheets.

| | No. | Plating method | Hot-rolled steel sheet manufacturing method number* | Activation conditions Ni-plating deposited amount g/m² | Heating temp. ° C. | Holding time sec | Zn-plating bath Entering sheet temp. ° C. | Heating temp. ° C. | Al concentration mass % | Zn deposited amount g/m² | Alloying Conditions Heating temp. ° C. | Holding time sec | Tensile test (JIS No. 5) YP (MPa) |
|---|---|---|---|---|---|---|---|---|---|---|---|---|---|
| Invention example | 28 | Method I | 4 | — | 600 | 60 | 460 | 460 | 0.18 | 45 | — | — | 880 |
| Comparative example | 29 | Method I | 4 | — | 700 | 60 | 460 | 460 | 0.18 | 45 | — | — | 861 |
| Invention example | 30 | Method I | 4 | — | 600 | 60 | 460 | 460 | 0.15 | 45 | 580 | 20 sec | 883 |
| | 31 | Method I | 4 | — | 650 | 60 | 460 | 460 | 0.15 | 45 | 580 | 20 sec | 882 |
| Invention example | 32 | Method I | 13 | — | 500 | 60 | 460 | 460 | 0.15 | 45 | 580 | 20 sec | 813 |
| Comparative example | 33 | Method I | 13 | — | 700 | 60 | 460 | 460 | 0.15 | 45 | 580 | 20 sec | 853 |
| | 34 | Method I | 13 | — | 600 | 60 | 460 | 460 | 0.15 | 45 | 700 | 20 sec | 808 |
| Invention example | 35 | Method II | 19 | 0.3 | 460 | 1 | 450 | 450 | 0.19 | 45 | — | — | 854 |
| Comparative example | 36 | Method II | 19 | 0.3 | 700 | 60 | 450 | 450 | 0.19 | 45 | — | — | 783 |
| Invention example | 37 | Method II | 19 | 0.3 | 460 | 1 | 450 | 450 | 0.19 | 45 | — | — | 863 |
| | 38 | Method II | 19 | 0.3 | 460 | 1 | 450 | 450 | 0.19 | 45 | 580 | 20 sec | 861 |
| | 39 | Method II | 19 | 0.1 | 460 | 1 | 450 | 450 | 0.19 | 45 | 580 | 20 sec | 858 |
| Invention example | 40 | Method II | 23 | 0.3 | 470 | 2 | 460 | 460 | 0.19 | 45 | — | — | 860 |
| | 41 | Method II | 23 | 0.3 | 470 | 1 | 460 | 460 | 0.19 | 45 | 580 | 20 sec | 815 |
| | 42 | Method II | 23 | 0.3 | 470 | 3 | 460 | 460 | 0.19 | 45 | 550 | 50 sec | 881 |
| Comparative example | 43 | Method II | 23 | 0.3 | 700 | 60 | 460 | 460 | 0.19 | 45 | 580 | 20 sec | 797 |
| Comparative example | 44 | Method II | 26 | 0.3 | 470 | 1 | 460 | 460 | 0.19 | 45 | 700 | 20 sec | 732 |

| | No. | Tensile test (JIS No. 5) TS (MPa) | EI (%) | Texture {211} <011> × random | Average crystal grain size d μm | r-value (strain: 3%) Δr | 0 | 45° | 90° | Hole expanding ratio λ (%) | TS × λ MPa × % | TS × EI MPa × % | Charpy test Transition temp. ° C. |
|---|---|---|---|---|---|---|---|---|---|---|---|---|---|
| Invention example | 28 | 967 | 15 | 2.2 | 6.3 | −0.05 | 0.85 | 0.91 | 0.88 | 75 | 72525 | 14505 | −61 |
| Comparative example | 29 | 883 | 18 | 2.3 | 8.5 | −0.11 | 0.81 | 0.93 | 0.83 | 92 | 81236 | 15894 | −23 |
| Invention example | 30 | 938 | 16 | 2.1 | 5.8 | −0.06 | 0.79 | 0.88 | 0.85 | 81 | 75978 | 15008 | −53 |
| | 31 | 975 | 15 | 1.8 | 6.1 | −0.09 | 0.82 | 0.91 | 0.83 | 76 | 74100 | 14625 | −51 |
| Invention example | 32 | 968 | 17 | 0.8 | 6.6 | −0.02 | 0.87 | 0.94 | 0.97 | 78 | 75504 | 16456 | −63 |
| Comparative example | 33 | 883 | 16 | 0.9 | 8.1 | −0.01 | 0.88 | 0.95 | 0.99 | 85 | 75055 | 14128 | −11 |
| | 34 | 875 | 18 | 1.1 | 7.5 | −0.02 | 0.86 | 0.94 | 0.98 | 90 | 78750 | 15750 | −28 |
| Invention example | 35 | 1018 | 14 | 1.7 | 5.9 | −0.13 | 0.90 | 1.05 | 0.94 | 71 | 72278 | 14252 | −78 |
| Comparative example | 36 | 873 | 16 | 1.5 | 8.4 | −0.15 | 0.83 | 1.02 | 0.91 | 83 | 72459 | 13968 | 7 |
| Invention example | 37 | 1023 | 15 | 1.5 | 5.6 | −0.15 | 0.85 | 1.06 | 0.97 | 72 | 73656 | 15345 | −62 |
| | 38 | 962 | 16 | 1.8 | 6.2 | −0.14 | 0.84 | 1.04 | 0.96 | 78 | 75036 | 15392 | −75 |
| | 39 | 1008 | 15 | 1.6 | 5.1 | −0.13 | 0.88 | 1.01 | 0.88 | 73 | 73584 | 15120 | −73 |
| Invention example | 40 | 975 | 15 | 1.1 | 5.2 | −0.05 | 0.85 | 0.93 | 0.91 | 78 | 76050 | 14625 | −63 |
| | 41 | 932 | 18 | 0.9 | 5.5 | −0.05 | 0.86 | 0.93 | 0.91 | 83 | 77356 | 16776 | −68 |
| | 42 | 992 | 16 | 1.3 | 5.3 | −0.08 | 0.91 | 1.01 | 0.95 | 73 | 72416 | 15872 | −73 |

-continued

| | | | | | | | | | | | |
|---|---|---|---|---|---|---|---|---|---|---|---|
| Comparative example | 43 | <u>893</u> | 15 | 1.2 | 7.3 | −0.04 | 0.86 | 0.91 | 0.88 | 88 | 78584 | 13395 | <u>−15</u> |
| Comparative example | 44 | <u>873</u> | 16 | 1.7 | 7.2 | −0.06 | 0.91 | 0.96 | 0.88 | 90 | 78570 | 13968 | <u>−18</u> |

Each steel sheet according to the present invention examples, including the steel sheets having the Zn-plating layer or the Fe—Zn-alloy-plating layer on the surface, has an X-ray random intensity ratio of 2.5 or less and a TS×λ value of 60000 or more in the evaluation of the hole expandability. Thus, each steel sheet according to the present invention examples has favorable hole expandability. Further, the average crystal grain size d of each steel sheet according to the present invention examples is 7.0 μm or less. Thus, each steel sheet according to the present invention example has favorable low-temperature toughness by having the ductile-brittle transition temperature of lower than or equal to −40° C.

Furthermore, each steel sheet according to the present invention examples has satisfied preferable conditions of the present invention as to the manufacturing method. As a result, preferable values of the present invention as to the X-ray random intensity ratio, the average crystal grain size, and the ductile-brittle transition temperature were secured.

In addition, each steel sheet according to the present invention examples was successfully plated without unplated parts, and is suitably used for usage that needs high corrosion resistance.

As for each of Comparative examples 28, 32, 35, and 42, the heating temperature in the activation conditions exceeded 650° C., and the average crystal grain size d of the steel sheet exceeded 7.0 μm. As a result, the ductile-brittle transition temperature was higher than −40° C., and the tensile strength was less than 900 MPa. Thus, Comparative examples 28, 32, 35, and 42 were poor. As for each of Comparative examples 33 and 43, the heating temperature in the activation conditions exceeded 650° C. and the average crystal grain size d of the steel sheet exceeded 7.0 μm. As a result, the ductile-brittle transition temperature was higher than −40° C., and the tensile strength was less than 900 MPa. Thus, Comparative examples 33 and 43 were poor.

The invention claimed is:

1. A hot-rolled steel sheet having a tensile strength of 900 MPa or more, the hot-rolled steel sheet consisting of, in mass %,
   C: greater than 0.050% and less than or equal to 0.10%,
   Si: greater than or equal to 0.1% and less than or equal to 2.0%,
   Mn: greater than or equal to 1.0% and less than or equal to 3.0%,
   P: less than or equal to 0.1%,
   S: less than or equal to 0.01%,
   Al: greater than or equal to 0.005% and less than or equal to 0.05%,
   N: less than or equal to 0.01%,
   Ti: greater than or equal to 0.10% and less than or equal to 0.20%,
   Nb: greater than or equal to 0% and less than or equal to 0.06%,
   B: greater than or equal to 0% and less than or equal to 0.03%,
   Ca: greater than or equal to 0% and less than or equal to 0.005%, and
   the balance: Fe and impurities,
   wherein an average crystal grain size is less than or equal to 7.0 μm, and
   wherein an X-ray random intensity ratio in {211} <011> orientation that is parallel to a rolled surface and a rolling direction is less than or equal to 2.5.

2. The hot-rolled steel sheet according to claim 1, including one or more selected from the group consisting of, in mass %,
   Nb: greater than or equal to 0.001% and less than or equal to 0.06%,
   B: greater than or equal to 0.0005% and less than or equal to 0.03%, and
   Ca: greater than or equal to 0.0005% and less than or equal to 0.005%.

3. The hot-rolled steel sheet according to claim 1, further comprising:
   a Zn-plating layer or an Fe—Zn-alloy-plating layer on a surface of the hot-rolled steel sheet.

4. The hot-rolled steel sheet according to claim 2, further comprising:
   a Zn-plating layer or an Fe—Zn-alloy-plating layer a surface of the hot-rolled steel sheet.

5. A method for manufacturing a hot-rolled steel sheet, the method comprising:
   performing hot-rolling on a slab having a chemical composition according to claim 1 at a temperature of higher than or equal to 1200° C. and lower than or equal to 1350° C.;
   ending the hot-rolling at a temperature of higher than or equal to 960° C. and lower than or equal to 1100° C.;
   within 1.0 second after the ending of the hot-rolling, starting quenching;
   quenching the hot-rolled steel sheet at an average cooling speed of greater than or equal to 80° C./second until the temperature becomes lower than the temperature at the ending of the hot-rolling by 50° C. to 200° C.; and
   winding up the hot-rolled steel sheet at a temperature of higher than or equal to 400° C. and lower than or equal to 600° C.,
   wherein a cooling after the ending of the quenching until the winding is performed at an average cooling speed of 20° C./second or more.

6. A method for manufacturing a hot-rolled steel sheet, the method comprising:
   performing hot-rolling on a slab having a chemical composition according to claim 2 at a temperature of higher than or equal to 1200° C. and lower than or equal to 1350° C.;
   ending the hot-rolling at a temperature of higher than or equal to 960° C. and lower than or equal to 1100° C.;
   within 1.0 second after the ending of the hot-rolling, starting quenching;
   quenching the hot-rolled steel sheet at an average cooling speed of greater than or equal to 80° C./second until the temperature becomes lower than the temperature at the ending of the hot-rolling by 50° C. to 200° C.; and
   winding up the hot-rolled steel sheet at a temperature of higher than or equal to 400° C. and lower than or equal to 600° C., wherein a cooling after the ending of the quenching until the winding is performed at an average cooling speed of 20° C./second or more.

7. The method for manufacturing a hot-rolled steel sheet according to claim 5, further comprising:
after the winding up, removing scale by acid cleaning and performing Zn-plating to form a Zn-plating layer.

8. The method for manufacturing a hot-rolled steel sheet having a tensile strength of 900 MPa or more, the method comprising:
after the winding up of the hot-rolled steel sheet manufactured by the method according to claim 5, removing scale by acid cleaning;
heating the hot-rolled steel sheet at a temperature of higher than or equal to 500° C. and lower than or equal to 650° C. in a reduction atmosphere to activate a surface of the hot-rolled steel sheet;
immersing the hot-rolled steel sheet in a molten Zn bath at a bath temperature of higher than or equal to 430° C. and lower than or equal to 490° C. in a state in which a temperature at the time of the immersing is higher than or equal to 420° C. and lower than or equal to 500° C.; and
adjusting a deposited amount of the Zn-plating by gas wiping.

9. The method for manufacturing a hot-rolled steel sheet having a tensile strength of 900 MPa or more, the method comprising:
after the winding up of the hot-rolled steel sheet manufactured by the method according to claim 5, removing scale by acid cleaning;
plating the hot-rolled steel sheet with Ni in greater than or equal to 0.05 g/m$^2$ and less than or equal to 3 g/m$^2$ by electrolysis;
heating the hot-rolled steel sheet at a temperature of higher than or equal to 420° C. and lower than or equal to 500° C. in a reduction atmosphere;
immersing the hot-rolled steel sheet in a molten Zn bath at a bath temperature of higher than or equal to 430° C. and lower than or equal to 490° C.; and
adjusting a deposited amount of the Zn-plating by gas wiping.

10. The method for manufacturing a hot-rolled steel sheet according to claim 8, further comprising:
after the gas wiping, heating the hot-rolled steel sheet at a temperature of higher than or equal to 500° C. and lower than or equal to 650° C. to form an Fe—Zn-plating layer.

11. The method for manufacturing a hot-rolled steel sheet according to claim 9, further comprising:
after the gas wiping, heating the hot-rolled steel sheet at a temperature of higher than or equal to 500° C. and lower than or equal to 650° C. to form an Fe—Zn-plating layer.

* * * * *